US008812299B1

(12) United States Patent
Su

(10) Patent No.: US 8,812,299 B1
(45) Date of Patent: Aug. 19, 2014

(54) CLASS-BASED LANGUAGE MODEL AND USE

(75) Inventor: Yi Su, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 783 days.

(21) Appl. No.: 12/943,426

(22) Filed: Nov. 10, 2010

Related U.S. Application Data

(60) Provisional application No. 61/358,275, filed on Jun. 24, 2010.

(51) Int. Cl.
*G06F 17/27* (2006.01)

(52) U.S. Cl.
USPC .......................... 704/9; 704/1; 704/2; 704/10

(58) Field of Classification Search
USPC ................................................ 704/9, 1, 2, 10
See application file for complete search history.

(56) References Cited

U.S. PATENT DOCUMENTS

| | | | |
|---|---|---|---|
| 2001/0051868 A1* | 12/2001 | Witschel | 704/9 |
| 2002/0055844 A1* | 5/2002 | L'Esperance et al. | 704/260 |
| 2005/0228657 A1* | 10/2005 | Chou et al. | 704/225 |
| 2008/0275694 A1* | 11/2008 | Varone | 704/9 |

OTHER PUBLICATIONS

Huang et al., "Hierarchical Bayesian Language Model for Conversational Speech Recognition", IEEE Transactions on Audio, Speech and Language Processing, Nov. 18, 2009.*

* cited by examiner

*Primary Examiner* — Qi Han
(74) *Attorney, Agent, or Firm* — Chapin IP Law, LLC

(57) ABSTRACT

This disclosure describes novel generation and use of a class-based language model. For example, one embodiment herein includes detecting presence of a common word that is used in different contexts in a word pool and assigning the common word to each of multiple classes in a class-based language model. Generation of the class-based language model and assignment of the common word to multiple classes the class-based language model as discussed herein enables generation of a more accurate probability score indicating how likely the common word follows a give sequence of one or more words in a sample text input.

14 Claims, 11 Drawing Sheets class 1: (river, bank, water, ...)
class 2: (bank, money, applicant, ...)
class 3: (government, industry, laws, ...)
class 4: (the, a, much, an, ...)
class 5: (to, ...)
class 6: (burrow, build, has, ...)
class 7: (of, how, in, when, ...)
...

CLASSES
155

FIG. 4

Assume that respective occurrences of words in word pool for classes having a word that follows the word sequence "in the" are as follows:

| | | | | |
|---|---|---|---|---|
| | 2 | 1 | 1 | 0 | total occurrences of words in class #1 = 2 + 1 + 1 = 4 |
| class #1: | (river, bank, water, lake) | | | |
| | 4 | 2 | 2 | | total occurrence of words in class #2 = 4 + 2 + 2 = 8 |
| class #2: | (bank, money, finance) | | | |
| | 1 | 2 | 1 | | total occurrence of words in class #3 = 1 + 2 + 1 = 4 |
| class #3: | (government, industry, laws) | | | |

Generation of the language model includes taking into account different contexts in which word "bank" is used. Based on the sample word pool, a financial "bank" is used in context 4 times more often than "bank" of a river following sequence "in the".

FIG. 5A

Further assume that number of occurrences of words in classes following the
word sequence "by the" in training documentation are as follows:

| | | | | |
|---|---|---|---|---|
| 1 | 0 | 1 | 2 | total occurrences of words in class #1 = 4 |
| class #1: (river, bank, water, lake) | | | | |
| 2 | 1 | 1 | | total occurrence of words in class #2 = 4 |
| class #2: (bank, money, applicant) | | | | |
| 4 | 2 | 2 | | total occurrence of words in class #3 = 8 |
| class #3: (government, industry, laws) | | | | |

FIG. 5B

205 → Banks also may offer what is called a money market deposit account, which earns interest at a rate set by the ... and usually limits the cutomer to a certain number of transactions winthin a stated time period.

FIG. 6

CLASS-BASED LANGUAGE MODEL AND USE

RELATED APPLICATIONS

This application is related to and claims the benefit of earlier filed U.S. Provisional Patent Application Ser. No. 61/358,275, entitled "Bayesian Class-Based Language Models," filed on Jun. 24, 2010, the entire teachings of which are incorporated herein by this reference.

BACKGROUND

Conventional language models are typically used in language processing applications such as speech recognition, machine translation, speech tagging, parsing, information retrieval, etc. Conventional language models can be used to determine a likelihood that a word or sequence of words has been uttered, scanned in a document, etc.

The term "class-based language model" refers to a specific family of language models that make use of word classes to improve their performance. Creation of a class-based language model can include analyzing one or more documents to derive classes of words. Each class in a class-based language model represents a set of words that are commonly used in the same context.

Conventional class-based language models can be used to determine a probability of a sequence of words under test. For example, using the class-based language model, a probability can be derived for a sequence of J words by means of a probability distribution. Estimating the probability of different word sequences or sentences can be difficult because phrases or sentences can be arbitrarily long and hence some sequences may not be observed during training of the language model. For this reason, the class-based language models are often approximated using the technique of smoothing, which assigns a proper probability to a sequence that is not observed during training.

In certain applications such as speech recognition and data compression applications, a language model can be used to capture the properties of a language as well as predict the next word or words in a sequence as discussed above. When used in information retrieval, a language model is associated with a document in a collection.

BRIEF DESCRIPTION

Conventional class-based language models suffer from multiple drawbacks. For example, as discussed above, conventional class-based language models produce multiple classes of words. In accordance with conventional class-based language models, however, each word is placed only in a single class. Thus, such conventional approaches do not take into account that a same word can be used in two or more different contexts.

As an example, when creating a conventional class-based language model based on documentation, the word "york" may describe a state, namely, the state of New York. The use of the word "york" in documentation, utterance, etc., also may refer to a company, namely, Olympia & York (a major property development firm). However, according to conventional techniques, even though the word "york" may be used in different ways or have many different meanings in training documentation, conventional language models would place the word "york" into a single class of the conventional class-based language model. Accordingly, the conventional class-based language model would not account for the possibility that the word "york" was used in multiple different contexts. In our example, according to conventional techniques, the word "york" would be placed in the class of words associated with the state or the class of words associated with the company, but not both. Because a respective word can fall in only a single class according to conventional techniques, a generated probability score indicating a likelihood score for a respective word following a given sequence of words may be inaccurate as a generated probability score is based on a class-based language model that assumes a respective word only falls into a single class and context without taking account that the word may be used in multiple different contexts.

Embodiments herein include novel generation and use of a class-based language model. For example, one embodiment herein includes assigning a common word found in a word pool to each of multiple classes in a class-based language model. Embodiments herein include deriving a first class of words from the word pool, the first class of words including a first group of words that appear in a first context in the word pool; and deriving a second class of words from the word pool, the second class of words including a second group of words that appear in a second context in the word pool. Assignment of a common word to multiple classes as discussed herein enables generation of a more accurate probability score indicating whether or how likely the common word follows a given sequence of one or more words in a sample text input.

More specifically, embodiments herein include a computer including one or more processor devices to create a class-based language model in which at least one particular word is placed into each of multiple classes. For example, an analyzer resource analyzes a distribution of words in a word pool such as documentation, utterances, etc. Based on the analyzing, the analyzer creates a class-based language model to include multiple classes of words. Each of the classes includes a group of words that typically appear together in the same context.

The analyzer assigns each class in a group of at least two of the multiple classes of words in the model to include a common word present in the word pool. In other words, embodiments herein include assigning a same or common word used in different contexts to each of multiple different classes in the class-based language model. Thus, a first class of a class-based language model can include a class of words that commonly appear in a first context. A second class can include a class of words that commonly appear in a second context. In contrast to conventional methods, according to embodiments herein, a common word (as used in at least two different contexts) is included in each of multiple classes such as both a first class and a second class.

Depending on the distribution of the words in the word pool as determined by the analyzer resource such as a language model generator, the analyzer resource stores word occurrence information and/or assigns probability information to words in the different classes to create the model. For example, the word "york" can be used in two different contexts such as a state or a company. According to embodiments herein, the word "york" can be assigned to a first class and a second class of the class-based language model. Thus, the class-based language model according to embodiments herein takes into account that the word can fall into one of two classes.

In more specific embodiments, assigning of probability information to the classes to create the class-based language model includes, for a particular word sequence in the document: identifying classes from the multiple classes that include a word that follows an occurrence of the particular word sequence (e.g., one or more words) in the word pool; generating normalized class probability values based on a likelihood that at least one word in each of the identified classes occurs after the particular word sequence; and assigning the normalized class probability values to the identified classes.

For each respective class of the identified classes that include a word that follows an occurrence of the particular word sequence in the word pool, embodiments herein further include generating normalized word probability values for words in the respective class based at least in part on a frequency of occurrence of words in the respective class following the particular word sequence in the word pool; and assigning the normalized probability values to words in the first class.

The class-based language model as discussed herein can be used in multiple different applications. For example, an application can receive and/or analyze part of a received sequence of words. The application can utilize the class-based language model to identify a probability that the next word in the sequence is a particular word.

In certain embodiments, the application utilizes the class-based language model to identify a next most likely word to be entered for a yet to be completed sequence of words. The next most likely word in the uncompleted sequence of words can be displayed for viewing.

Embodiments herein can further include utilizing the class-based language model to generate a value or probability score indicative of a likelihood of that a particular word follows a given sequence of words based on a class-based language model trained from a respective word pool.

The conventional class-based language models, as discussed above, do not take into account different probabilities for a given word when the given word falls into multiple classes. That is, as discussed above, conventional class-based language models typically decide in which single class of multiple possible classes to assign a word. Each word is assigned to only one class even though a given word may be used in multiple different contexts and/or has different meanings. Such conventional class-based language models therefore do not take into account a possibility that a word can have multiple meanings.

In contrast to the conventional language models as discussed above in the background, embodiments herein include, recognizing that a meaning of a word can vary depending on how the word is used in context. As an example, based on an analysis of input such as a word pool to train a class-based language model, an analyzer resource that trains a class-based language model recognizes that the word "york" is used in multiple different contexts—namely, the analyzer identifies that "york" can be used in the context of a state name or a company name. The analyzer resource according to embodiments herein places the word "york" in both a first class and a second class of the class-based language model. The first class can represent a first grouping of words that are commonly used together in a first context. The word "york" in the first class typically refers to New York state. The second class can represent a second grouping of words that commonly appear together in accordance with a second usage. The word "york" in the second class typically refers to a company, namely, the company Olympia & York. Accordingly, the common word assigned to a first class in the class-based language model can have a first meaning. The common word assigned to a second class in the class-based language model can have a second meaning.

These and other embodiments are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium on which software instructions are encoded for subsequent execution. The instructions, when executed in a computerized device having a processor, program and cause the processor to perform the operations disclosed herein. Such arrangements are typically provided as software, code, instructions, and/or other data (e.g., data structures) arranged or encoded on storage hardware. The storage hardware can include a computer readable storage medium such as an optical medium (e.g., CD-ROM), floppy disk, hard disk, memory stick, etc., or other a medium such as firmware or microcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, one particular embodiment of the present disclosure is directed to a computer program product that includes a hardware-based computer readable storage medium having instructions stored thereon for generating and/or using a class-based language model as discussed herein. For example, in one embodiment, the instructions, when carried out by a processor of a respective computer device, cause the processor to: analyzing a distribution of words in a word pool to train a class-based language model; creating the class-based language model to include multiple classes of words; assigning each class in a group of at least two of the multiple classes of words to include a common word present in the word pool; and depending on the distribution of the words in the word pool, generating probability information associated with the classes to create the model.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Nuance Communications, Inc., Burlington, Mass., USA.

As discussed above, techniques herein are well suited for use in software and/or hardware applications that generate and/or use class-based language models. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or, where suitable, in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 4 is an example diagram illustrating generation of classes based on a word according to embodiments herein.

FIGS. 5A and 5B are example cases illustrating counts for occurrences of words in word pool according to embodiments herein.

FIG. 6 is an example diagram illustrating a sample text input according to embodiments herein.

DETAILED DESCRIPTION

As discussed above, one embodiment herein includes novel generation and use of a class-based language model. For example, embodiments herein include assigning a common word to each of multiple classes in a class-based language model. Assignment of a common word to multiple classes as discussed herein enables generation of more accurate word probability scores.

Figure 1:
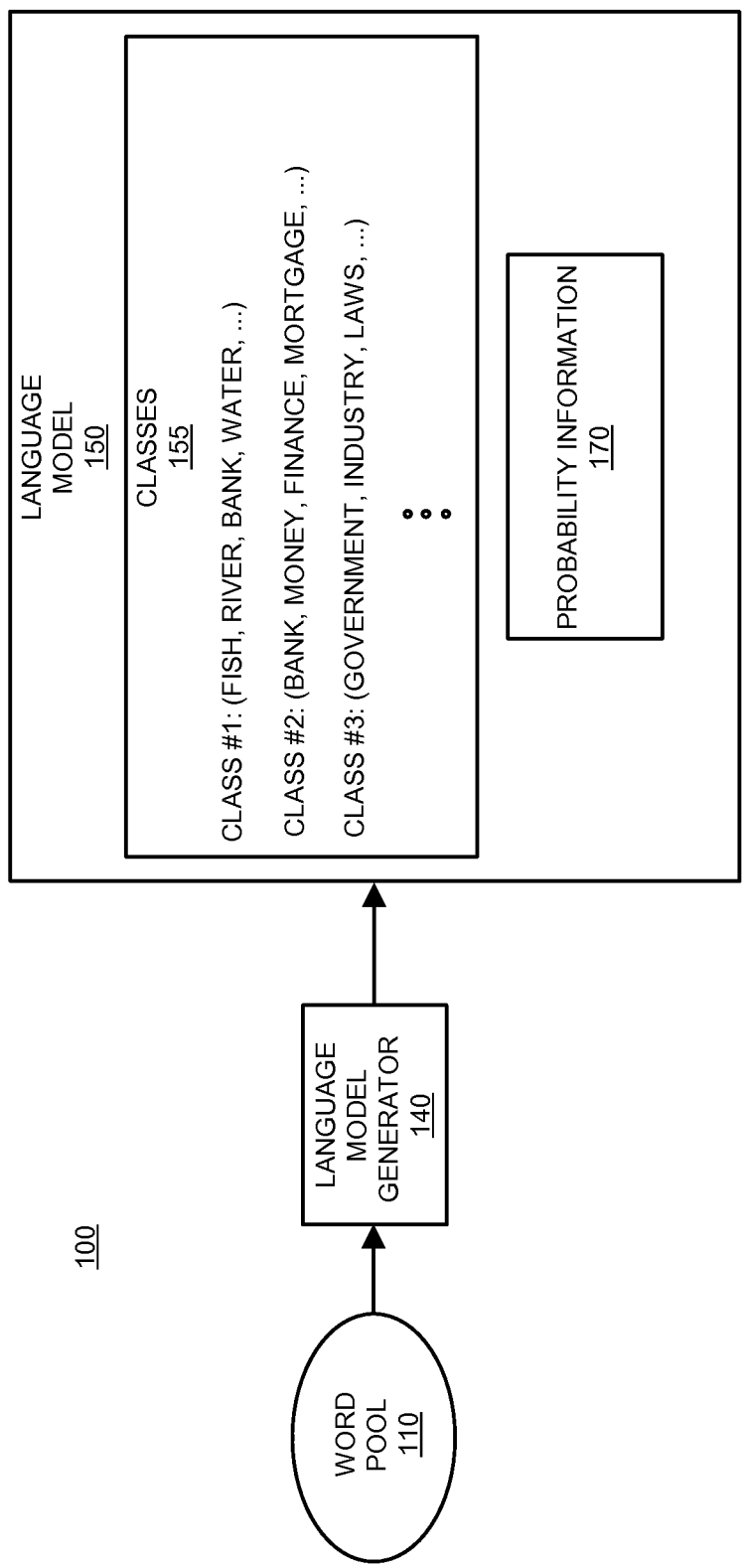
FIG. 1 is an example diagram of a computer environment for creating a language model according to embodiments herein.

FIG. 1 is an example diagram illustrating a computer environment 100 for creating a class-based language model according to embodiments herein.

As shown, language model generator 140 analyzes words in word pool 110 to create language model 150. In one embodiment, the language model 150 generated by the language model generator 140 is a Bayesian class-based language model.

Word pool 110 can be a text-based resource such as ordered words, a document of words, uttered words in an audio file, etc.

In one embodiment, the language model generator 140 receives input indicating a number of classes 155 to be generated for the language model 150. Depending on the embodiment, the number of classes can vary between a single class and a class for each word in the word pool 110. However, in certain embodiments, the number of classes is usually between five and fifteen, although language model 150 can be configured to include any suitable number of classes.

Generation of classes 155 and determining membership of words in classes 155 can be performed in any suitable manner. For example, in one embodiment, the word classes 155 can be generated via so-called agglomerative clustering. In such an embodiment, each word in the word pool 110 is initially placed into its own class. For each pair of classes, the language model generator 140 computes the increase of training set likelihood and merge the pairs that would increase the likelihood most. This process of merging is repeated until the desired number of classes is reached.

In accordance with another embodiment, the word classes 155 are generated via so-called exchange-based clustering. In such an embodiment, the language model generator 140 starts with a predetermined number of classes. For each word, the language model generator 140 computes the increase of training set likelihood when moving the given word to other classes and moves the given word to the class that increases the likelihood most. This process is repeated until no move can be made to increase the likelihood for each word in the classes.

Any suitable method can be used to generate the different classes of words.

When generating classes 155, the language model generator 140 (e.g., analyzer resource) creates the language model 150 by placing at least one particular word into each of multiple classes. For example, the language model generator 140 analyzes a distribution of words in the word pool 110. Based on the analyzing, the language model generator 140 creates the language model 150 to include multiple classes 155 of words.

In one embodiment, the language model generator 140 analyzes the words present in word pool 110 and creates each class of classes 155 to include words in the word pool 110 that typically appear together in the same context. At least one word is placed in each of multiple classes.

As an example, assume that the language model generator 140 produces class #1 to include the words "fish", "river", "bank", "water", etc.; language model generator 140 produces class #2 to include "bank", "money", "finance", "mortgage", etc.; the language model generator 140 produces class #3 includes "government", "industry", "laws", etc.

In one embodiment, the language model generator 140 analyzes word pool 110 to identify identical words in the word pool 110 that are used in multiple contexts. As an example, assume in this example that the language model generator 140 identifies that the word "bank" in word pool 110 is used in two different contexts. In the first context, the word "bank" in the word pool 110 refers to a heap or mound of earth near a lake or river. In the second context, the word "bank" in the word pool 110 refers to a financial institution.

In contrast to conventional class-based language modeling, the language model generator 140 assigns each class such as class #1 and class #2 of classes 155 to include the word "bank". Class #1 of the language model 150 includes a class of words that commonly appear in a first context. Class #2 of the language model 150 includes words that commonly appear in a second context.

Note that a particular word may be used in yet further contexts. For example, a same word may be used in three, four, or more different contexts. In such an instance, the word can be included in respective three, four, or more classes.

Depending on the distribution of the words in the word pool 110 as determined by the language model generator 140, the language model generator 140 assigns probability information 170 to words in the different classes to create the language model 150. Among other information, the probability information 170 can include count information indicating occurrences of words in the word pool 110 following certain phrases, count values for words in the different classes, etc.

In contrast to the conventional language models as discussed above in the background, embodiments herein include, recognizing that a meaning of a word can vary depending on how the word is used in different contexts in the word pool 110. As an example, based on an analysis of input such as the word pool 110 to train a language model 150, a language model generator 140 recognizes that the word "bank" is used in multiple different contexts in the word pool 110—namely, the language model generator 140 identifies that "bank" can be used in the context of mounded earth or a financial institution. The language model generator 140 places the word "bank" in both class #1 and class #2 of the language model 150. Class #1 represents a first grouping of words that are commonly used together in a first context. The word "bank" in the first class typically refers to mounded earth. The second class represents a second grouping of words that commonly appear together in accordance with a second usage. The word "bank" in the second class refers to a financial institution. Accordingly, the common word assigned to a first class in the class-based language model can have a first meaning. The common word assigned to a second class in the class-based language model can have a second meaning.

Creation of language model 150 includes generating probability information 170. As discussed above and as will be discussed in more detail below, the probability information 170 can include statistical information about occurrences of words, location of words relative to each other, etc., for words in word pool 110. More information of the probability information 170 is discussed below.

To account for inclusion of the common word (e.g., the word "bank" in this example) into the multiple classes (i.e., class #1 and class #2) of the language model 150, appropriate count values can be used to produce a value indicative of how likely the common word follows a sequence of words.

Generating the probability information 170 can include: for each class of the multiple classes 150, generating class probability values based on occurrence of words in the word pool 110, each of the class probability values indicative of a probability that any word in a respective class follows an occurrence of a particular word sequence; generating word probability values for each word in a respective class of the multiple classes, each of the word probability values indicative of a probability that a respective word in the respective class follows occurrence of the particular word sequence in the word pool 110.

Figure 2:
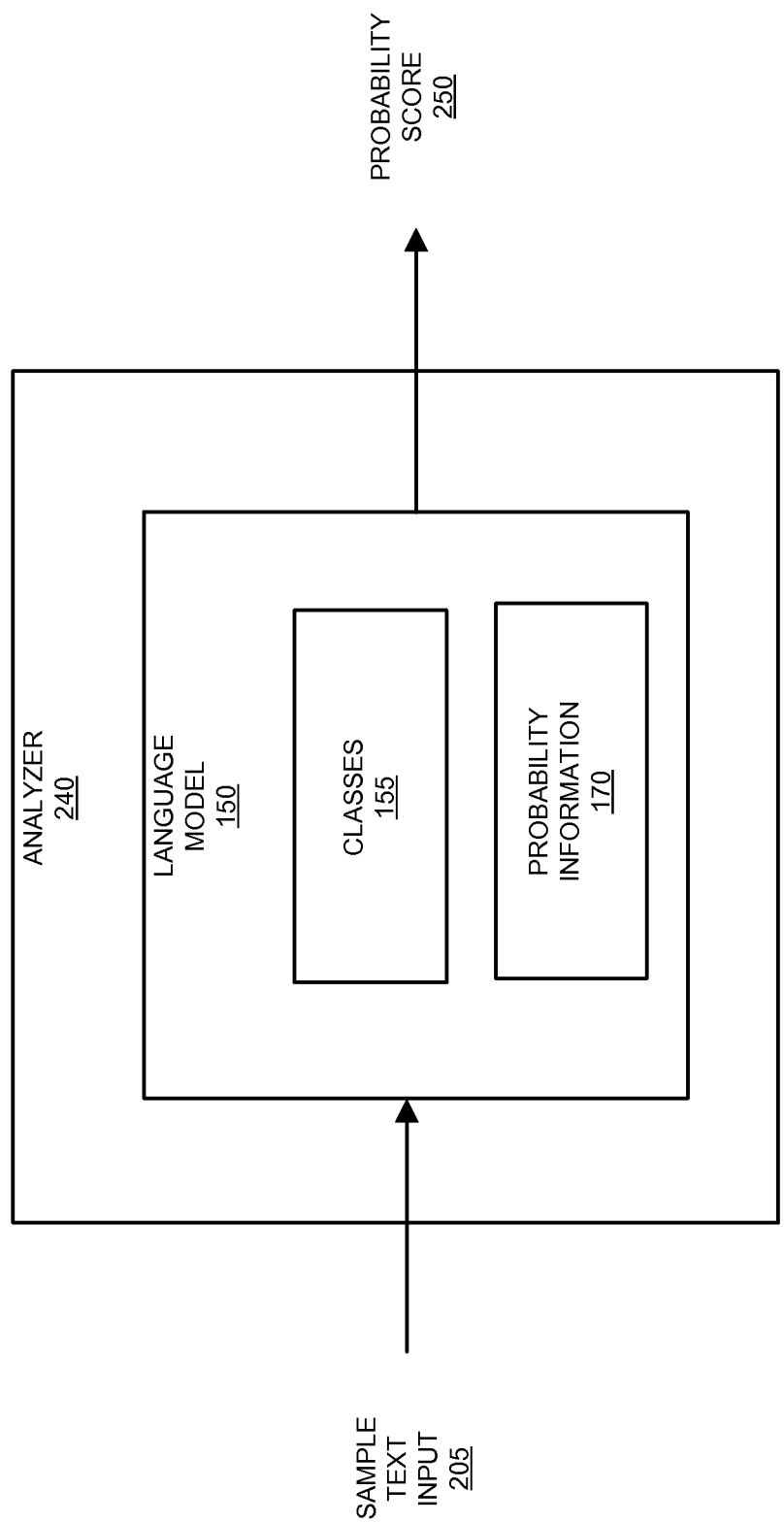
FIG. 2 is an example diagram illustrating use of a language model according to embodiments herein.

FIG. 2 is an example diagram illustrating use of a language model according to embodiments herein.

As shown, analyzer 240 in consumer environment 100 receives a sample text input 205 and utilizes language model 150 to produce a probability score 250 for all or part of the sample text input 205.

In one embodiment, the sample text input 205 is a string of text currently inputted by a user typing on a keyboard. In accordance with such an embodiment, the analyzer 240 utilizes the class-based language model 150 to identify probabilities for next possible words in the text string and identify a next most likely word to be entered for a yet to be completed sequence of words. After determining a next most likely word, the next most likely word in the uncompleted sequence of words can be displayed for viewing to the user typing the string of text.

In accordance with other embodiments, the sample text 250 represents any type of input text such as scanned text, uttered words, etc., to be verified by the language model 150.

In accordance with these embodiments, the analyzer 240 utilizes the class-based language model 150 to generate a probability score 250 indicative of a likelihood of one or more words in a given sequence of words from the perspective of the language model 150.

Figure 3:
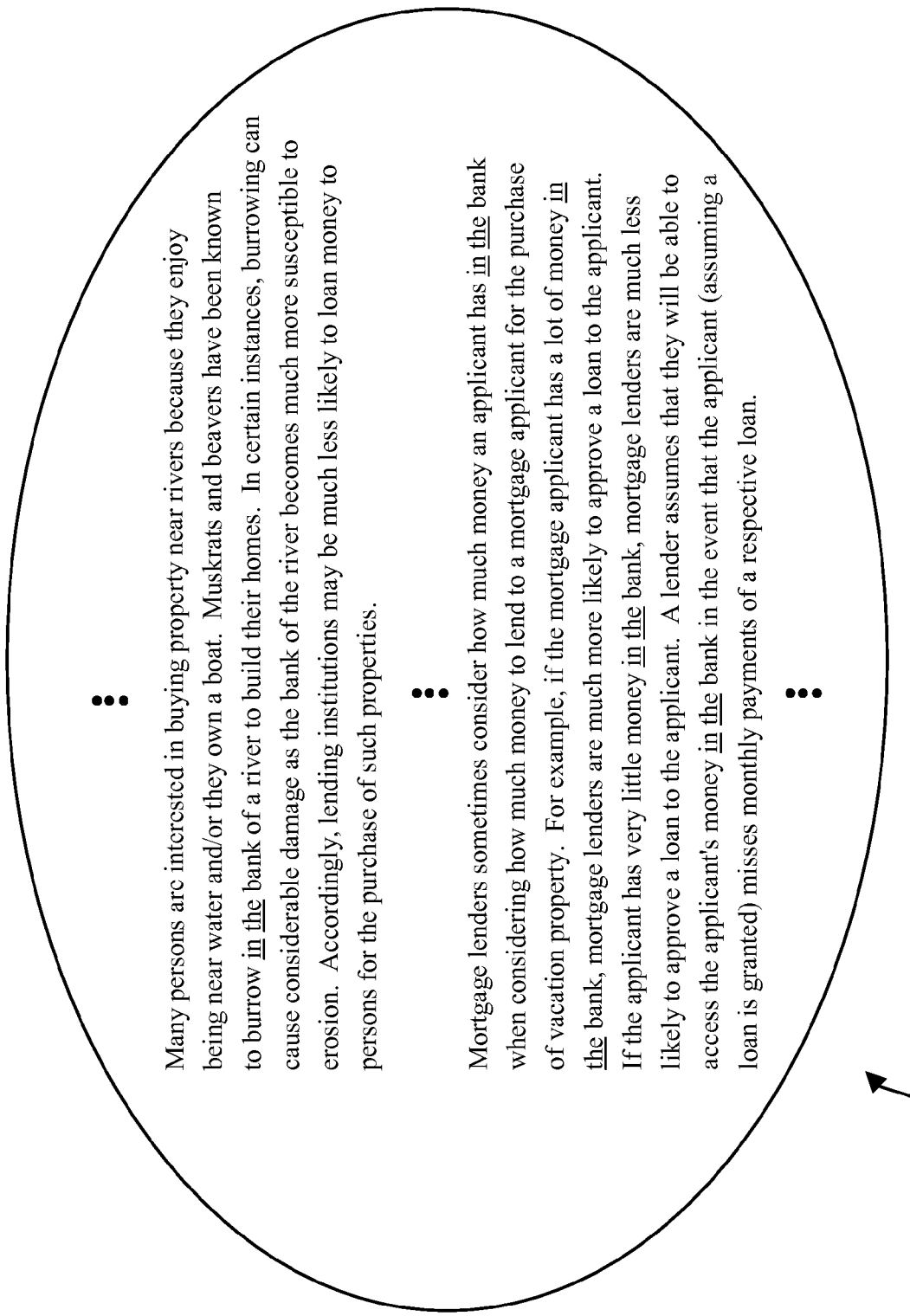
FIG. 3 is a diagram illustrating an example word pool according to embodiments herein.

FIG. 3 is an example diagram illustrating a word pool according to embodiments herein. Word pool 110 can represent written or spoken text or a combination of both.

As previously discussed, the language model generator 140 analyzes word pool 110 to train language model 150. For example, the language model generator 140 produces classes 155 and respective probability information 170 based on a distribution of words in word pool 110.

As shown, example word pool 110 includes a case in which the word "bank" is used in multiple contexts as discussed above. For example, in a first context, use of the word "bank" in word pool 110 refers to a riverbank. In a second context, use of the word "bank" in word pool 110 refers to a financial institution.

FIG. 4 is an example diagram illustrating classes according to embodiments herein. Assume in this example that the language model generator 140 analyzes the word pool 110 and produces the classes 155. Note that the language model generator 140 identifies that the word "bank" in word pool 110 is used in multiple contexts and therefore assigns the word "bank" to class 1 and class 2 as previously discussed, as shown in FIG. 4.

In one embodiment, the language model generator 140 assigns a class label for each instance of a word of the word pool 110 using a so-called method called Gibbs sampling technique. The process includes starting with random assignments of words to classes and then iteratively re-assigning class labels to each instance of word until the whole process converges to a "reasonably good" state. The following text appears in word pool 110. During the creation of classes, the language model generator 140 assigns the classes to words as follows:

| ... | to | burrow | in | the | Bank | of | a | river | to | build | ... |
|-----|----|--------|----|----|------|----|---|-------|----|-------|-----|
| ... | 5  | 6      | 7  | 4  | 1    | 7  | 4 | 1     | 5  | 6     | ... |

| ... | how | much | money | an | applicant | has | in | the | bank | when | ... |
|-----|-----|------|-------|----|-----------|-----|----|----|------|------|-----|
| ... | 7   | 4    | 2     | 4  | 2         | 6   | 7  | 4   | 2    | 7    | ... |

To produce count information and/or probability information, for each of the respective classes 155, the language model generator 140 identifies occurrences of all possible word sequences in the word pool 110 immediately preceding any word in the respective class. For each possible preceding word sequence associated with a class, the language model generator 140 identifies or counts a number of occurrences in the word pool 110 in which each respective word in the class follows the respective preceding word sequence. By way of a non-limiting example, the preceding word sequence may be one word, two words, three words, etc. The language model generator 140 stores the count information to generate probability information 170 as used and discussed below.

FIG. 5A is an example case illustrating creation of the language model and tracking word count information according to embodiments herein.

As shown, after creating classes 155 of words, and based on word pool 110, the language model generator 140 identifies that the word sequence "in the" precedes at least one word in each of classes including class 1, class 2, and class 3. The language model generator 140 keeps track of how often each word in the respective classes follows the word sequence "in the" in the word pool 110. Based on word pool 110, the language model generator 140 repeats this step of identifying and storing count information for each possible word sequence that can precede a word in each of the classes.

In this example, based on analyzing the word pool 110, for the words in the different classes 155, assume that the language model generator 140 identifies two occurrences in word pool 110 where the word "river" follows the word sequence "in the"; one occurrence in word pool 110 where the word "bank" (in class 1 context of a river bank) follows the word sequence "in the"; one occurrence where the word "water" follows the word sequence "in the"; zero occurrences in word pool 110 where the word "lake" follows the word sequence "in the"; four occurrences in word pool 110 where the word "bank" (in class 2 context of a financial bank) follows the word sequence "in the"; two occurrences in word pool 110 where the word "money" follows the word sequence "in the"; two occurrences in word pool 110 where the word "applicant" follows the word sequence "in the"; one occurrences in word pool 110 where the word "government" follows the word sequence "in the"; two occurrences in word pool 110 where the word "industry" follows the word sequence "in the"; one occurrence in word pool 110 where the word "laws" follows the word sequence "in the"; and so on.

Note that the word "bank" (e.g., financial bank) is used 4 times more often in the word pool 110 following the word sequence "in the" than does the word "bank" (e.g., river bank) follow the word sequence "in the". As discussed below, use of the language model 150 and generating probability values takes into account that any references to a bank are four times more likely to refer to a financial bank than a riverbank.

For each class, the language model generator 140 sums the number of occurrences that a word in the respective class follows the word sequence "in the". In this example, assume that there are a total of four occurrences in which a word in class 1 follows the word sequence "in the"; there are a total of eight occurrences in which a word in class 2 follows the word sequence "in the"; there are a total of four occurrences in which a word in class 3 follows the word sequence "in the".

In a similar manner as discussed above, the language model generator 140 keeps track of the number of occurrences of words in the classes for different word sequences in the word pool 110 that precede the words in the classes.

Thus, according to embodiments herein, the language model generator 140 can be configured to assign and/or track probability information 170 associated with words in the classes 155 to create the class-based language model 150. For example, for a particular word sequence (e.g., "in the", "as for", "to", "the", etc.) in the word pool 110, the language model generator 140 identifies a set of classes from the multiple classes 155 that include a word that follows an occurrence of that particular word sequence in the word pool 110. The language model generator 140 then generates a class probability value and/or count values (for the respective class) indicating a likelihood that at least one word in each of the identified classes occurs after the particular word sequence. The language model generator 140 then assigns the class probability values to the identified classes.

In accordance with further embodiments, for each respective class of the identified classes, the language model generator 140: generates count and/or word probability values for words in the respective class based at least in part on an occurrence of any word in the respective class following the particular word sequence in the word pool; and assigns the word probability values to words in the respective class. This is discussed in more detail below.

FIG. 5B is an example case illustrating creation of the language model and tracking count information according to embodiments herein.

As shown, the language model generator 140 identifies that the word sequence "by the" precedes at least one word in each of classes including class 1, class 2, and class 3. The language model generator 140 keeps track of how often each word in the respective classes 155 follows the word sequence "by the" in the word pool 110. The language model generator 140 repeats this step for each possible word sequence that can precede a word in each of the classes.

In this example, based on analyzing the word pool 110, assume that the language model generator 140 identifies one occurrence in the word pool 110 where the word "river" in class 1 follows the word sequence "by the"; zero occurrences in word pool 110 where the word "bank" (in class 1 context of a river bank) follows the word sequence "by the"; one occurrence in word pool 110 where the word "water" follows the word sequence "by the"; two occurrences in word pool 110 where the word "lake" follows the word sequence "by the"; two occurrences in word pool 110 where the word "bank" (in class 2 context of a financial bank) follows the word sequence "by the"; one occurrence in word pool 110 where the word "money" follows the word sequence "by the"; two occurrences in word pool 110 where the word "applicant" follows the word sequence "by the"; four occurrences in word pool 110 where the word "government" follows the word sequence "by the"; two occurrences in word pool 110 where the word "industry" follows the word sequence "by the"; two occurrence in word pool 110 where the word "laws" follows the word sequence "in the"; and so on.

Note that the word "bank" (e.g., financial bank) never follows the sequence "by the" in the word pool 110. As discussed below, use of the language model 150 and count information takes into account that it is possible that the word "bank" in class 2 follows the word sequence "by the" even though the sequence "by the bank" never appears in the word pool 110.

As shown, for each class, the language model generator 140 sums the number of occurrences that a word in the respective class follows the word sequence "by the". In this example, there are four occurrences in which a word in class 1 follows the word sequence "by the"; there are four occurrences in which a word in class 2 follows the word sequence "by the"; there are eight occurrences in which a word in class 3 follows the word sequence "by the".

In a similar manner as discussed above, the language model generator 140 keeps track of the number of occurrences of words in the classes for different word sequences in the word pool 110 that precede the words in the classes.

FIG. 6 is an example diagram illustrating a sample text input 205 according to embodiments herein.

In one embodiment, analyzer 240 applies the language model 150 to the sample text input 205 to determine the likelihood that the next word following "by the" in sample text input 205 is or will be the word "bank". A likelihood of other words in classes 155 also can be calculated to determine a next most likely word to follow the sample text input 205. As discussed below, embodiments herein include receiving sample text input 205 such as an uncompleted sequence of words; utilizing uniquely generated probability values derived from the class-based language model 150 for the common word in each of the multiple classes 155 to identify a next most likely word to be entered for the uncompleted sequence of words. The next most likely word in the sequence can be displayed to a user.

In accordance with other embodiments, the analyzer 240 merely generates a score indicating a likelihood that the next word in the sequence following "by the" in sample text input 205 is a particular word such as the word "bank". Thus, embodiments herein include utilizing the class-based language model 150 to generate a value indicative of a likelihood of a word following a received sequence of words.

Based on the word pool 110, the probability that word "bank" follows "by the" in sample text input 205 is equal to an overall probability value, $P_T$, where $P_T = P_A + P_B$:

where $P_A$=Probability that word "bank" in class 1 follows "by the"=$P_{11} \cdot P_{12}$;

where $P_{11}$=Probability that any word in class 1 follows "by the";

$P_{12}$=Probability of "bank" in class 1, when following "by the";

where $P_B$=Probability that word "bank" in class 2 follows "by the"=$P_{21} \cdot P_{22}$;

where $P_{21}$=Probability any word in class 2 follows "by the";

$P_{22}$=Probability of "bank" in class 2, when following "by the". However, recall that the word "bank" in class 1 never occurred in word pool 110 following the word sequence "by the". Rather than using a probability of zero that the word "bank" follows the sequence "by the", embodiments herein include generating a non-zero probability value that the word "bank" in class 1 follows the word sequence "by the".

For example, we have never seen the word "bank" in class #1 following "by the" in our training documentation. Embodiments herein include solving this problem by looking at all of the words in class #1 following the reduced word sequence "the" (rather than word sequence "by the"), which includes words following "in the" as well as "by the":

| class #1: | 3 | 1 | 2 | 2 | total occurrences of words in class #1 = 8 |
|---|---|---|---|---|---|
| | (river, bank, lake, water) | | | | |

There is no problem for class #2 and class #3 because the word "bank" in class 2 follows the word sequence "by the" in the word pool 110. Therefore, embodiments herein include keeping them intact:

| class #2: | 2 | 1 | 1 | total occurrence of words in class #2 = 4 |
|---|---|---|---|---|
| | (bank, money, applicant) | | | |

| class #3: | 4 | 2 | 2 | total occurrence of words in class #3 = 8 |
|---|---|---|---|---|
| | (government, industry, laws) | | | |

Based on detecting the occurrences of words in word pool 110 and producing the language model 150 as previously discussed, the following values for probabilities are computed as follows:

$P_{11}$=(# of occurrences in word pool of words in class 1 following "by the")/(total # of occurrences in word pool of words in class 1, class 2, and class 3 following "by the")

=(1+2+1)/(1+2+1+2+1+1+4+2+2)=0.25 (3-gram processing)

$P_{12}$=(# of occurrences in word pool that "bank" in class 1 follows "the")/(total # of occurrences in word pool in which any word in class 1 follows "the")=

(1)/(3+1+2+2)=0.125 (Embodiments herein include degenerating to 2-gram processing instead of 3-gram processing because the probability of "bank" in class 1 cannot be a zero value. That is, based on generating $P_{12}$ based on 2-gram processing, there is now a non-zero probability that the word "bank" in class 1 followed the word sequence "by the".)

$P_{21}$=(# of occurrences in word pool of words in class 2 following "by the")/(total # of occurrences in word pool of words in class 1, class 2, and class 3 following "by the")

=(2+1+1)/(1+2+1+2+1+1+4+4+2)=0.25 (3-gram processing)

$P_{22}$=(# of occurrences in word pool that "bank" in class 2 follows "by the")/(total # of occurrences in word pool in which any word in class 2 follows "by the")

=(2)/(2+1+1)=0.5 (3-gram processing)

$P_A$=0.25×0.125=0.03125

$P_B$=0.25×0.5=0.125

$P_T$=0.03125+0.125=0.15625

The above steps are repeated many times to produce a final probability value for the word "bank" following "by the" in our sample text input 205. For example, in one embodiment, analyzer repeats the process of producing the classes via Gibbs sampling, identifying counts of occurrences of words following "in the", identifying counts of occurrences of words following "by the", and producing a probability value, $P_T$. The final probability value for $P_T$ can be an average value of the generated $P_T$ values on each pass. More specifically, $P_{Tave} = (P_{T1} + P_{T2} + P_{T3} + \ldots + P_{TN})/N$, where N equals the number of iterations of producing $P_T$.

Note that probability score $P_T$ takes into account that "bank" can be used in different contexts as discussed herein.

Accordingly, embodiments herein include a language model generator 140 that: analyzes a distribution of words in a word pool 110 to train a class-based language model 150; creates the class-based language model 150 to include multiple classes of words 155; assigns each class in a group of at least two of the multiple classes 155 of words to include a common word (e.g., "bank") present in the word pool 110; and depending on the distribution of the words in the word pool, generates probability information associated with the classes to create the model. The language model generator 140 further assigns the common word "bank" to a first class and a second class.

The analyzer 240 utilizes the class-based language model to generate an overall probability value ($P_T$ or average value of multiple $P_T$) indicative of how likely the common word follows a sample sequence of words. The probability value can indicate whether one word is more likely to follow another word. For example, in response to detecting that a sequence of words (e.g., "by the bank") including a combination of the sample sequence ("by the") immediately followed by the common word ("bank") in the first class never occurs in the word pool 110, the analyzer 140 performs operations of: producing a modified sample sequence (i.e., reduces the sequence "by the" to the merely "the") by removing at least one word "by" from the sample sequence "by the"; generating a first probability value (e.g., $P_{12}$) based at least in part on a probability that the common word ("bank") in class 1 follows an occurrence of the modified sample sequence (e.g., the word "the") in the word pool 110. The analyzer 240 multiplies the value $P_{12}$ with $P_{11}$ to produce $P_A$.

In response to detecting that there is at least one occurrence in which the common word "bank" in the second class follows the sample sequence "by the" in the word pool 110, the analyzer 240 generates a second probability value (e.g., $P_{22}$) based at least in part on a number of occurrences in which the common word "bank" in the second class follows an occurrence of the sample sequence "by the" in the word pool 110. The analyzer 240 multiplies the value $P_{22}$ with $P_{21}$ to produce $P_B$.

The analyzer 240 then sums the probability value $P_A$ and $P_B$ to produce the overall probability value $P_T$.

Conventional Way of Generating Probability Value

As previously discussed, conventional processing has been used to generate a probability score for a word based on a language model. However, conventional ways of generating a probability are based on inclusion of the word "bank" in only a single class because such conventional methods do not take into account that a word can be used in different contexts.

The following example illustrates how assignment of a word such as "bank" to only a single class may result in generation of inaccurate probability scores. For example, assume that the word "bank" is placed in just one class such as class 2 (and not in class 1) in the example below even though the word is used in multiple contexts in word pool 110.

Assume occurrence information for the word "bank" are as follows:

| class #1: | 1 | 2 | 1 | total occurrences of words |
| | (river, lake, water) | | | in class #1 = 4 |

| class #2: | 2 | 1 | 1 | total occurrence of words |
| | (bank, money, finance) | | | in class #2 = 4 |

| class #3: | 4 | 2 | 2 | total occurrence of words |
| | (government, industry, laws) | | | in class #3 = 8 |

In the above example, based on analyzing the word pool 110, assume that a conventional language model generator generates the classes to include words as above. The language model generator identifies one occurrence in word pool 110 where the word "river" follows the word sequence "by the"; two occurrences where the word "lake" follows the word sequence "by the"; one occurrence where the word "water" follows the word sequence "by the"; two occurrences where the word "bank" follows the word sequence "by the"; one occurrence where the word "money" follows the word sequence "by the"; one occurrence where the word "applicant" follows the word sequence "by the"; two occurrences where the word "industry" follows the word sequence "by the"; two occurrences where the word "laws" follows the word sequence "by the"; and so on.

$P_{21}$ = (# of occurrences of words in class 2 following "by the")/(total # of occurrences of words in class 1, class 2, and class 3 following "by the")

= (2+1+1)/(1+2+1+2+1+1+4+2+2) = 4/16 = 0.25

$P_{22}$ = (# of occurrences in class 2 that "bank" follows "by the")/(total # of occurrences in which any word in class 2 follows "by the")

= (2)/(2+1+1) = 2/4 = 0.5

$P_T$ = 0.25 × 0.5 = 0.125

Note that $P_T$ = 0.125 represents an inaccurate probability score because it does not take into that the word "bank" is used in different contexts.

Figure 7:
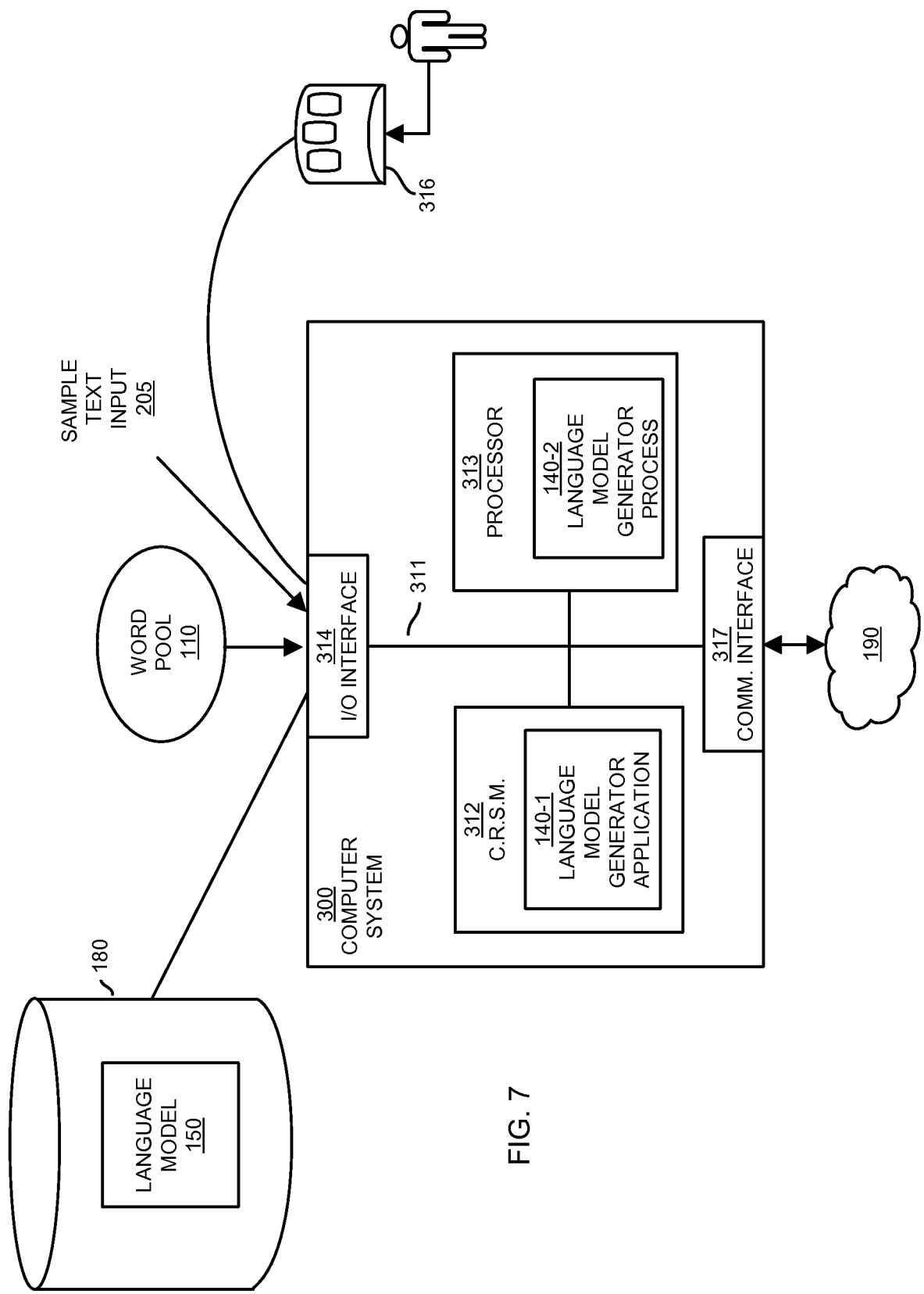
FIG. 7 is a diagram illustrating an example computer architecture for executing a language model generator and/or a analyzer according to embodiments herein.

FIG. 7 is an example block diagram of a consumer environment 100 for executing language model generator application 140 and analyzer 240 according to embodiments herein.

Computer system 300 can include one or more computerized devices such as a personal computer, workstation, portable computing device, console, network terminal, processing device, network device, etc., operating as a server, client, etc.

Note that the following discussion provides a basic embodiment indicating how to carry out language model generation according to embodiments herein. However, it should be noted that the actual configuration for carrying out the operations as described herein can vary depending on a respective application.

As shown, computer system 300 of the present example includes an interconnect 311 that couples computer readable storage media 312 such as a non-transitory type or hardware type of media in which digital information or instructions can be stored and retrieved, a processor 313, I/O interface 314, and a communications interface 317.

I/O interface 314 provides connectivity to repository 180 and, if present, other devices 316 such as display screen, peripheral devices, keyboard, computer mouse, etc.

Computer readable storage medium 312 can be any suitable device such as memory, optical storage, hard drive, floppy disk, hardware-based computer readable storage medium, non-transitory computer readable storage medium, etc. In one embodiment, the computer readable storage medium 312 is a non-transitory storage media or hardware-based computer readable storage medium configured to store data, instructions, etc.

Communications interface 317 enables computer environment 100 to communicate over a resource such as network 190 to retrieve information from remote sources and communicate with other computers. I/O interface 314 enables processor 313 to retrieve or attempt retrieval of stored information from repository 180.

As shown, computer readable storage media 312 can be encoded with software, firmware, instructions, etc., executed by processor 313.

During operation of one embodiment, processor 313 accesses computer readable storage media 312 via the use of interconnect 311 in order to launch, run, execute, interpret or otherwise perform the instructions of language model generator application 140-1 stored in computer readable storage medium 312.

Execution of the language model generator application 140-1 produces processing functionality such as language model generator process 140-2 in processor 313. In other words, the language model generator process 140-2 associated with processor 313 represents one or more aspects of executing language model generator application 140-1 within or upon the processor 313 in the computer system 300.

Those skilled in the art will understand that the computer system 300 can include other processes and/or software and hardware components, such as an operating system that controls allocation and use of hardware resources to execute language model generator application 140-1.

Also, note that computer system 300 can be configured to carry out analyzer 240 according to embodiments herein. For example, computer system 300 (or similarly configured computer system) can include a hardware-based or non-transitory computer readable storage medium including instructions to carry out execution of analyzer 240. A processor in the computer system executes the instructions to perform the steps of utilizing the language model 150 as discussed herein.

In accordance with different embodiments, note that computer system 300 may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by resources in computer environment 100 and language model generator 140 will now be discussed via flowcharts in FIGS. 8-11. As discussed above, the language model generator 140 can be configured to execute the steps in the flowcharts as discussed below.

Note that there will be some overlap with respect to concepts discussed above for FIGS. 1 through 7. Also, note that the steps in the below flowcharts need not always be executed in the order shown. The steps can be executed in any suitable order.

Figure 8:
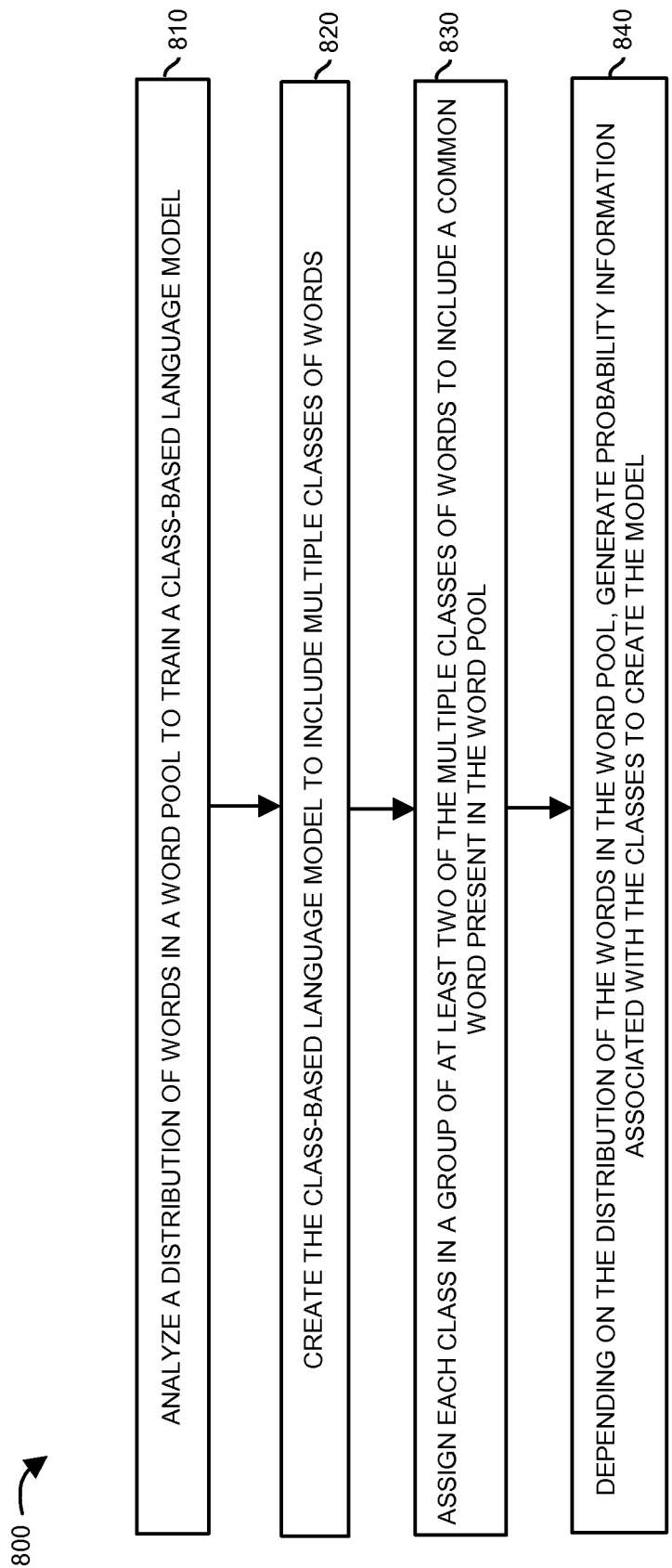
FIG. 8 is a flowchart illustrating an example method of creating a language model according to embodiments herein.

FIG. 8 is a flowchart 800 illustrating a general technique of creating a language model according to embodiments herein.

In step 810, the language model generator 140 analyzes a distribution of words in a word pool 110 to train a class-based language model 150.

In step 820, the language model generator 140 creates the class-based language model 150 to include multiple classes 155 of words.

In step 830, the language model generator 140 assigns each class in a group of at least two of the multiple classes 155 of words to include a common word present in the word pool 110.

In step 840, the language model generator 140 generates, depending on the distribution of the words in the word pool 110, probability information 170 associated with the classes 155 to create the language model.

Figure 9:
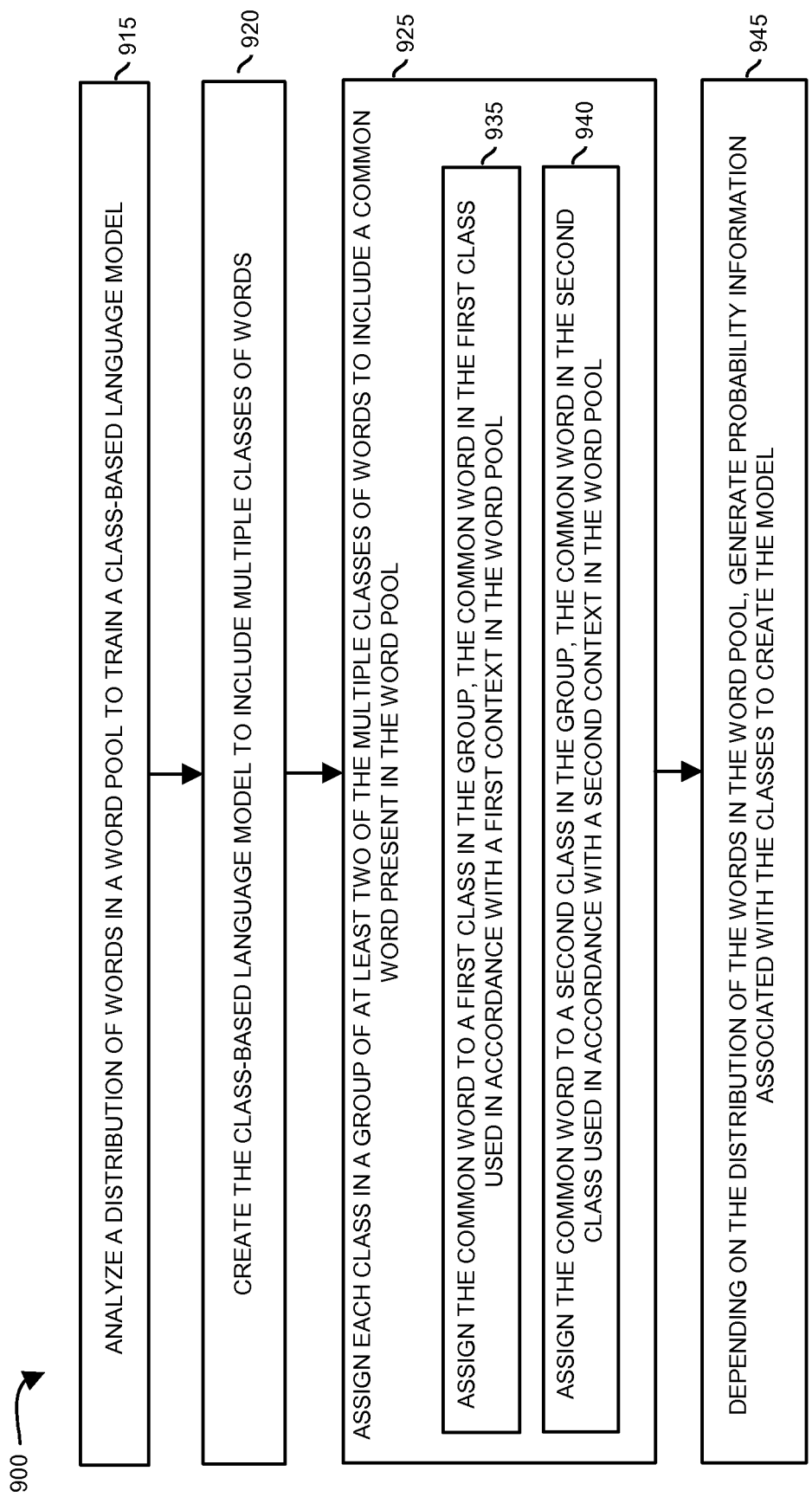
FIG. 9 is a flowchart illustrating an example method of creating a language model according to embodiments herein.

FIG. 9 is a flowchart 900 illustrating creation of a language model according to embodiments herein.

In step 915, the language model generator 140 analyzes a distribution of words in a word pool 110 to train a class-based language model 150.

In step 920, the language model generator 140 creates the class-based language model 150 to include multiple classes 155 of words.

In step 925, the language model generator 140 assigns each class in a group of at least two of the multiple classes 155 to include a common word present in the word pool 110.

In step 935, the language model generator 140 assigns the common word to a first class in the group, the common word in the first class used in accordance with a first context in the word pool 110.

In step 940, the language model generator 140 assigns the common word to a second class in the group, the common word in the second class used in accordance with a second context in the word pool 110.

In step 945, the language model generator 140 depending on the distribution of the words in the word pool 110, generates probability information 170 associated with the classes 155 to create the model 150.

Figure 10:
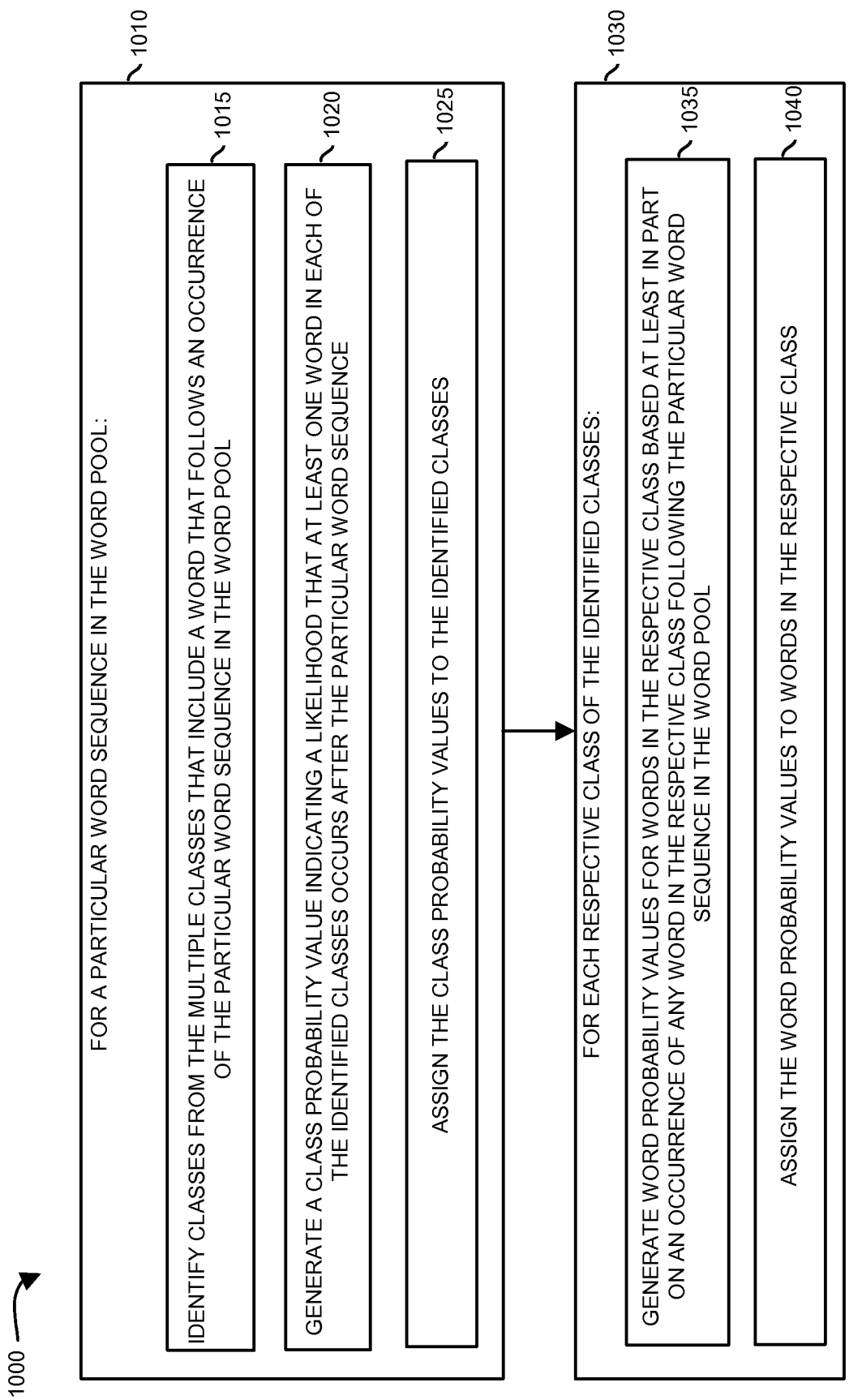
FIG. 10 is a flowchart illustrating analysis of a word pool and tracking of count information according to embodiments.

FIG. 10 is a flowchart 1000 illustrating creation of language model and probability information according to embodiments herein.

In step 1010, the language model generator 140 selects a particular word sequence (e.g., "in the") occurring in the word pool 110.

For the particular word sequence in the word pool:

In step 1015, the language model generator 140 identifies classes (e.g., class #1, class #2, and class #3) from the multiple classes 155 that include a word that follows an occurrence of the particular word sequence in the word pool 110.

In step 1020, the language model generator 140 generates, via count information, a class probability value indicating a likelihood that at least one word in each of the identified classes occurs after the particular word sequence. In accordance with the count information in FIG. 5A, the language model generator 140 generates, for the word sequence "in the", the class probability value=(2+1+1+0)/(2+1+1+0+4+2+2+1+2+1)=0.25 to class #1; the language model generator 140 assigns, for the word sequence "in the", the class probability value=(4+2+2)/(2+1+1+0+4+2+2+1+2+1)=0.5 to class #2; and the language model generator 140 assigns, for the word sequence "in the", the class probability value=(1+2+1)/(2+1+1+0+4+2+2+1+2+1)=0.25 to class #3. The language model generator 140 repeats this process for count values in FIG. 5B. In step 1025, the language model generator 140 assigns the class probability values created in step 1020 to the identified classes.

In step 1030, for each respective class of the identified classes the language model generator 140, the language model generator 140 performs the following steps:

In step 1035, the language model generator 140 generates word probability values for words in the respective class based at least in part on an occurrence of any word in the respective class following the particular word sequence in the word pool. For example, for the word sequence "in the": the language model generator 140 generates a probability of (2)/(2+1+1)=0.5 to the word "river" in class #1; the language model generator 140 generates a probability of (1)/(2+1+1)=0.25 to the word "bank" in class #1; the language model generator 140 generates a probability of (1)/(2+1+1)=0.25 to the word "water" in class #1; the language model generator 140 generates a probability of (4)/(4+2+2)=0.5 to the word "bank" in class #2; the language model generator 140 generates a probability of (2)/(4+2+2)=0.25 to the word "money" in class #2; the language model generator 140 generates a probability of (2)/(4+2+2)=0.25 to the word "finance" in class #2; the language model generator 140 generates a probability of (1)/(1+2+1)=0.25 to the word "government" in class #3; the language model generator 140 generates a probability of (2)/(1+2+1)=0.5 to the word "industry" in class #3; the language model generator 140 generates a probability of (1)/(1+2+1)=0.25 to the word "laws" in class #3.

In step 1040, the language model generator 140 assigns the word probability values created in step 1035 to words in the respective class.

Accordingly, embodiments herein include: for each class of the multiple classes 155, generating class probability values based on occurrence of words in the word pool 110, each of the class probability values indicative of a probability that any word in a respective class follows an occurrence of a particular word sequence; generating word probability values for each word in a respective class of the multiple classes, each of the word probability values indicative of a probability that a respective word in the respective class follows occurrence of the particular word sequence in the word pool 110.

Note again that techniques herein are well suited for creating and using language models. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:

performing, by computer processing hardware, operations of:
analyzing a distribution of repeat occurrences of words in a word pool to train a class-based language model;
creating the class-based language model to include multiple classes of words, the multiple classes of words including at least a first class of words and a second class of words;
identifying a word present in the word pool;
assigning the word to the first class of words;
assigning the word to the second class of words; and
depending on the distribution of the repeat occurrences of the words in the word pool, generating probability information associated with the multiple classes to create the class-based language model;

wherein the word assigned to the first class is used in accordance with a first meaning in the word pool, the first class of words including a first set of words from the word pool that are commonly used together in a first context;

wherein the word assigned to the second class is used in accordance with a second meaning in the word pool, the second class of words including a second set of words from the word pool that are commonly used together in a second context;

the method further comprising: receiving a sample sequence of words;

utilizing the class-based language model to identify an overall probability value indicative of how likely an instance of the word follows the sample sequence of words; and wherein utilizing the class-based language model to identify the overall probability value includes:

in response to detecting that there is no occurrence in which the word in the first class follows an instance of the sample sequence in the word pool: i) producing a modified sample sequence by removing at least one word from the sample sequence; ii) generating a first probability value based at least in part on a probability that the word in the first class follows an occurrence of the modified sample sequence in the word pool; and in response to detecting that there is at least one occurrence in which the word in the second class follows the sample sequence in the word pool, generating a second probability value based at least in part on a number of occurrences in which the word in the second class follows an occurrence of the sample sequence in the word pool.

2. The method as in claim 1, wherein creating the class-based language model includes:

deriving the first class of words from the word pool, the first class of words including a first group of words that appear in the first context in the word pool; and deriving the second class of words from the word pool, the second class of words including a second group of words that appear in the second context in the word pool, the second context different than the first context.

3. The method as in claim 1 further comprising:

for a particular word sequence in the word pool:
identifying classes from the multiple classes that include a corresponding word that follows an occurrence of the particular word sequence in the word pool;
generating a class probability value indicating a likelihood that at least one word in each of the identified classes occurs after the particular word sequence; and
assigning the class probability values to the identified classes.

4. The method as in claim 3 further comprising:

for each respective class of the identified classes:
based at least in part on an occurrence of any word in the respective class following the particular word sequence in the word pool, generating word probability values for words in the respective class; and
assigning the word probability values to words in the respective class.

5. The method as in claim 1, wherein analyzing the distribution of repeat occurrences of words includes:

via application of a Gibbs sampling algorithm:
randomly assigning words in the word pool to different classes; and
iteratively reassigning the words in the word pool to different classes to produce the multiple classes of words.

6. The method as in claim 1, wherein creating the class-based language model includes creating a Bayesian class-based language model.

7. The method as in claim 1, wherein generating the probability information comprises:

for each class of the multiple classes, generating class probability values based on occurrence of words in the word pool, each of the class probability values indicative of a probability that any word in a respective class follows an occurrence of a particular word sequence; and
generating word probability values for each word in a respective class of the multiple classes, each of the word probability values indicative of a probability that a respective word in the respective class follows occurrence of the particular word sequence in the word pool.

8. A computer-readable, hardware storage medium having instructions stored thereon for processing data information, such that the instructions, when carried out by a processing device, cause the processing device to perform operations of:

analyzing a distribution of repeat occurrences of words in a word pool to train a class-based language model;
creating the class-based language model to include multiple classes of words, the multiple classes including a first class of words and a second class of words;
identifying a word present in the word pool;
including the word in the first class of words;
including the word in the second class of words; and
depending on the distribution of the repeat occurrences of the words in the word pool, generating probability information associated with the multiple classes to create the class-based language model;
wherein the word assigned to the first class is used in accordance with a first meaning in the word pool, the first class of words including a first set of words from the word pool that are commonly used together in a first context;
wherein the word assigned to the second class is used in accordance with a second meaning in the word pool, the second meaning different than the first meaning, the second class of words including a second set of words from the word pool that are commonly used together in a second context;
the computer-readable storage medium further including instructions stored thereon that causes the processing device to perform operations of: receiving a sample sequence of words; and utilizing the class-based language model to identify an overall probability value indicative of how likely an instance of the word follows the sample sequence of words, the overall probability value generated based on a likelihood that an instance of the word follows an instance of the sample sequence of words in the word pool;
in response to detecting that there is no occurrence in which the common word in the first class follows the sample sequence in the word pool: i) producing a modified sample sequence by removing a at least one word from the sample sequence: ii) generating a first probability value based at least in part on a probability that the common word in the first class follows an occurrence of the modified sample sequence in the word pool;
in response to detecting that there is at least one occurrence in which the common word in the second class follows the sample sequence in the word pool, generating a second probability value based at least in part on a number of occurrences in which the word in the second class follows an occurrence of the sample sequence in the word pool; and
summing the first probability value and the second probability value to produce the overall probability value.

9. The computer-readable storage medium as in claim 8, wherein creating the class-based language model includes:

deriving the first class of words from the word pool, the first class of words including a first group of words that appear in the first context in the word pool; and
deriving the second class of words from the word pool, the second class of words including a second group of words that appear in the second context in the word pool.

10. The computer-readable storage medium as in claim 8 further including instructions stored thereon that causes the processing device to perform operations of:

for a particular word sequence in the word pool:
identifying classes from the multiple classes that include a word that follows an occurrence of the particular word sequence in the word pool;
generating a class probability value indicating a likelihood that at least one word in each of the identified classes occurs after the particular word sequence; and
assigning the class probability values to the identified classes.

11. The computer-readable storage medium as in claim 10 further including instructions stored thereon that causes the processing device to perform operations of:

for each respective class of the identified classes:
based at least in part on an occurrence of any word in the respective class following the particular word sequence in the word pool, generating word probability values for words in the respective class; and
assigning the word probability values to words in the respective class.

12. The computer-readable storage medium as in claim 8 further including instructions stored thereon that causes the processing device to perform operations of:

utilizing the class-based language model to generate a probability value indicative of a likelihood of a word following a sequence of words, the probability value based on a first probability that an instance of the word in the first class follows an instance of the sequence of words in the word pool and a second probability that an instance of the word in the second class follows an instance of the sequence of words in the word pool.

13. The computer-readable storage medium as in claim 8, wherein generating the probability information comprises:

for each class of the multiple classes, generating class probability values based on occurrence of words in the word pool, each of the class probability values indicative of a probability that any word in a respective class follows an occurrence of a particular word sequence; and generating word probability values for each word in a respective class of the multiple classes, each of the word probability values indicative of a probability that a respective word in the respective class follows occurrence of the particular word sequence in the word pool.

14. A computer system comprising:

a processor;

a memory unit that stores instructions associated with an application executed by the processor; and an interconnect coupling the processor and the memory unit, enabling the computer system to execute the application and perform operations of:

analyzing a distribution of words in a word pool to train a class-based language model;

creating the class-based language model to include multiple classes of words;

assigning two classes of the multiple classes of words to include a common word present in the word pool; and depending on the distribution of the words in the word pool, generating probability information associated with the multiple classes to create the class-based language model wherein the word assigned to the first class is used in accordance with a first meaning in the word pool, the first class of words including a first set of words from the word pool that are commonly used together in a first context;

wherein the word assigned to the second class is used in accordance with a second meaning in the word pool, the second class of words including a second set of words from the word pool that are commonly used together in a second context;

receiving a sample sequence of words;

utilizing the class-based language model to identify an overall probability value indicative of how likely an instance of the word follows the sample sequence of words; and wherein utilizing the class-based language model to identify the overall probability value includes:

in response to detecting that there is no occurrence in which the word in the first class follows an instance of the sample sequence in the word pool:

producing a modified sample sequence by removing at least one word from the sample sequence;

generating a first probability value based at least in part on a probability that the word in the first class follows an occurrence of the modified sample sequence in the word pool; and in response to detecting that there is at least one occurrence in which the word in the second class follows the sample sequence in the word pool, generating a second probability value based at least in part on a number of occurrences in which the word in the second class follows an occurrence of the sample sequence in the word pool.

\* \* \* \* \*